US011013065B2

(12) United States Patent
Zhang et al.

(10) Patent No.: US 11,013,065 B2
(45) Date of Patent: May 18, 2021

(54) DOWNLINK INTERFERENCE MANAGEMENT METHOD, BASE STATION, AND USER EQUIPMENT (71) Applicant: HUAWEI TECHNOLOGIES CO., LTD., Guangdong (CN)

(72) Inventors: Jietao Zhang, Shenzhen (CN); Xiong Zhou, Shenzhen (CN); Hongcheng Zhuang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 33 days.

(21) Appl. No.: 16/204,261

(22) Filed: Nov. 29, 2018

(65) Prior Publication Data
US 2019/0110335 A1 Apr. 11, 2019

Related U.S. Application Data (63) Continuation of application No. PCT/CN2017/085022, filed on May 19, 2017.

(30) Foreign Application Priority Data

May 31, 2016 (CN) .......................... 201610378335.6

(51) Int. Cl.
H04W 88/08 (2009.01)
H04J 11/00 (2006.01)
(Continued)

(52) U.S. Cl.
CPC .......... *H04W 88/08* (2013.01); *H04B 17/336* (2015.01); *H04J 11/00* (2013.01);
(Continued)

(58) Field of Classification Search
CPC . H04W 88/08; H04W 24/02; H04W 72/0486; H04W 72/0446; H04W 40/16;
(Continued)

(56) References Cited

U.S. PATENT DOCUMENTS 8,837,335 B2 9/2014 Susitaival et al.
8,942,745 B2* 1/2015 Centonza .......... H04W 72/0426
455/501

(Continued)

FOREIGN PATENT DOCUMENTS

CN 101635927 A 1/2010
CN 101651879 A 2/2010
(Continued)

OTHER PUBLICATIONS

Technical Specification Group Radio Access Network;Evolved Universal Terrestrial Radio Access Network (E-UTRAN); X2 application protocol (X2AP), Mar. 2015, 3GPP TS 36.423 V11.9.0 (Year: 2015).*

(Continued)

*Primary Examiner* — Tejis Daya
(74) *Attorney, Agent, or Firm* — Womble Bond Dickinson (US) LLP (57) ABSTRACT The present invention discloses a downlink interference management method, applied to interference coordination between a serving base station of a cell serving at least one first user equipment and a neighboring-cell base station of the cell, including: obtaining, by the serving base station, downlink interference overload information, where the downlink interference overload information is used to indicate an interfered-with transmission resource of the first user equipment; and sending, by the serving base station, the downlink interference overload information to the neighboring-cell base station, so that the neighboring-cell base station performs interference coordination on the transmission resource. The downlink interference overload information sent by the serving base station to the neighboring-cell base station may instruct the neighboring-cell base station to (Continued)

perform interference coordination on the interfered-with transmission resource.

6 Claims, 5 Drawing Sheets

(51) Int. Cl.

| | |
|---|---|
| *H04W 72/04* | (2009.01) |
| *H04L 5/00* | (2006.01) |
| *H04B 17/336* | (2015.01) |
| *H04W 24/08* | (2009.01) |
| *H04W 24/10* | (2009.01) |
| *H04W 40/16* | (2009.01) |
| *H04W 72/08* | (2009.01) |

(52) U.S. Cl.
CPC .......... *H04J 11/005* (2013.01); *H04L 5/0073* (2013.01); *H04W 24/08* (2013.01); *H04W 24/10* (2013.01); *H04W 40/16* (2013.01); *H04W 72/0446* (2013.01); *H04W 72/0486* (2013.01); *H04W 72/082* (2013.01)

(58) Field of Classification Search
CPC ... H04W 24/10; H04W 24/08; H04W 72/082; H04J 11/00; H04J 11/005; H04J 11/0056; H04L 5/0073; H04L 5/0035; H04B 17/336
See application file for complete search history.

(56) References Cited

U.S. PATENT DOCUMENTS

| | | | |
|---|---|---|---|
| 2010/0255854 A1 | 10/2010 | Lee et al. | |
| 2010/0284303 A1* | 11/2010 | Catovic | H04W 24/02 370/254 |
| 2012/0014333 A1* | 1/2012 | Ji | H04L 5/0032 370/329 |
| 2012/0083262 A1* | 4/2012 | Dimou | H04W 36/0055 455/423 |
| 2012/0331478 A1 | 12/2012 | Zhu et al. | |
| 2013/0040683 A1* | 2/2013 | Siomina | H04W 28/0236 455/517 |
| 2013/0053077 A1* | 2/2013 | Barbieri | H04L 5/0048 455/509 |
| 2013/0201966 A1* | 8/2013 | Weng | H04W 56/0015 370/336 |
| 2013/0217402 A1 | 8/2013 | Lin | |
| 2013/0294268 A1 | 11/2013 | Xu et al. | |
| 2014/0024388 A1* | 1/2014 | Earnshaw | H04W 72/02 455/452.2 |
| 2014/0370908 A1* | 12/2014 | Lee | H04L 5/0032 455/452.1 |
| 2015/0003272 A1* | 1/2015 | Hu | H04L 5/14 370/252 |
| 2015/0016374 A1* | 1/2015 | Liang | H04W 52/16 370/329 |
| 2015/0085716 A1 | 3/2015 | Zhang et al. | |
| 2015/0119057 A1* | 4/2015 | Fujito | H04W 72/0426 455/452.1 |
| 2015/0189666 A1* | 7/2015 | Wang | H04W 72/1226 370/329 |
| 2015/0195715 A1 | 7/2015 | Nagata et al. | |
| 2015/0208363 A1* | 7/2015 | Fu | H04L 5/00 370/280 |
| 2015/0264652 A1* | 9/2015 | Zhang | H04W 52/143 455/522 |
| 2015/0282202 A1* | 10/2015 | Miao | H04L 5/0057 370/329 |
| 2015/0327257 A1 | 11/2015 | Zhang et al. | |
| 2016/0006529 A1* | 1/2016 | Yi | H04J 11/0056 370/329 |
| 2016/0029239 A1* | 1/2016 | Sadeghi | H04W 24/10 370/252 |
| 2018/0279149 A1* | 9/2018 | Li | H04W 72/085 |

FOREIGN PATENT DOCUMENTS

| | | | | |
|---|---|---|---|---|
| CN | 101729130 A | 6/2010 | | |
| CN | 101815301 A | 8/2010 | | |
| CN | 101827383 A | 9/2010 | | |
| CN | 101917729 A | 12/2010 | | |
| CN | 102065490 A | 5/2011 | | |
| CN | 102088735 A | 6/2011 | | |
| CN | 102223645 A | 10/2011 | | |
| CN | 103582000 A | 2/2014 | | |
| CN | 104272837 A | 1/2015 | | |
| WO | WO-2011119750 A1 * | 9/2011 | ........ | H04W 72/0426 |
| WO | 2013138988 A1 | 9/2013 | | |
| WO | WO-2013177774 A1 * | 12/2013 | ........ | H04W 72/1226 |
| WO | 2014107122 A1 | 7/2014 | | |
| WO | 2014110762 A1 | 7/2014 | | |
| WO | 2014114106 A1 | 7/2014 | | |
| WO | WO-2014165711 A1 * | 10/2014 | ........... | H04W 24/10 |
| WO | 2015021628 A1 | 2/2015 | | |
| WO | 2016027131 A1 | 2/2016 | | |
| WO | 2016075515 A1 | 5/2016 | | |
| WO | WO-2016075515 A1 * | 5/2016 | ............... | H04L 1/00 |

OTHER PUBLICATIONS

Extended European Search Report dated Apr. 10, 2019 in corresponding European Patent Application No. 17805675.0 (8 pages).
International Search Report, dated Jul. 21, 2017, in International Application No. PCT/CN2017/085022 (4 pp.).
3GPP TS 36.423 V13.3.0 (Mar. 2016); "3rd Generation Partnership Project; Technical Specification Group Radio AccessNetwork; Evolved Universal Terrestrial Radio Access Network(E-UTRAN); X2 application protocol" (X2AP) (Release 13), total 231 pages.
Jiang, Lei et al., "Cross-Subframe Co-Channel Interference Mitigation Scheme for LTE-Advanced Dynamic TDD System", 2013 IEEE, total 5 pages.
NTT Docomo, "Discussion on Backhaul Signaling for eIMTA", 3GPP TSG RAN WG1 Meeting #74 R1-133450, Barcelona, Spain, Aug. 19-23, 2013, total 5 pages.
Chen, Qinqin et al., "A Closed-Loop UL Power Control Scheme for Interference Mitigation in Dynamic TD-LTE Systems", 2015 IEEE, total 5 pages.
Zhong, Yi et al., "Dynamic TDD Enhancement through Distributed Interference Coordination", IEEE ICC 2015—Mobile and Wireless Networking Symposium, total 7 pages.
Catania, Davide et al., "Flexible UL/DL in Small Cell TDD Systems: A Performance Study with TCP Traffic", 2015 IEEE, total 6 pages.
Na, Changning et al., "Interference Alignment Based Dynamic TDD for Small Cells", Globecom 2014 Workshop—Telecommunications Standards—From Research to Standards, total 6 pages.
Chinese Office Action dated Jan. 31, 2019 in corresponding Chinese Patent Application No. 201610378335.6 (10 pages).
International Search Report dated Jul. 21, 2017 in corresponding International Patent Application No. PCT/CN2017/085022.

* cited by examiner

DOWNLINK INTERFERENCE MANAGEMENT METHOD, BASE STATION, AND USER EQUIPMENT

CROSS-REFERENCE TO RELATED APPLICATIONS

This application is a continuation of International Application No. PCT/CN2017/085022, filed on May 19, 2017, which claims priority to Chinese Patent Application No. 201610378335.6, filed on May 31, 2016. The disclosures of the aforementioned applications are hereby incorporated by reference in their entireties.

TECHNICAL FIELD

The present invention relates to the field of communications technologies, and in particular, to a downlink interference management method, a base station, and user equipment.

BACKGROUND

High rates and diversity are two typical requirements of future personal communications services. Dense network deployment can shorten a wireless communication range and provide a basic assurance for implementation of a high-rate connection. A time division duplex (TDD) mode can help a network serve diversified services, so as to satisfy different uplink/downlink service requirements of users for various applications. Therefore, a major trend of a future network architecture is to densely deploy stations in the TDD duplex mode.

Dense network deployment greatly shortens a coverage radius of each cell. In most cases, a quantity of users served by a cell in a dense network deployment scenario is far less than that in a macro cell scenario. With diversity of user services, services of each cell may fluctuate relatively greatly. To be specific, uplink/downlink services of a cell change rapidly within a short period of time. In view of this, the 3rd Generation Partnership Project (3GPP) proposes enhanced interference management and traffic adaptation (eIMTA) and studies a dynamic TDD subframe configuration of a cell. To be specific, within tens of milliseconds, each cell can dynamically select, based on a rapid change in service requirements of the cell, a TDD subframe configuration adapted to a service. Each cell configures, based on the service requirements of the cell, the TDD subframe configuration adapted to the service of the cell. This may result in different TDD subframe configurations between a plurality of neighboring cells. For the dynamic TDD subframe configuration, some TDD subframes in each TDD subframe configuration are referred to as fixed subframes, and other TDD subframes are referred to as flexible subframes. In terms of a fixed subframe, TDD subframe configurations in the subframe are corresponding to a same transmission direction, namely, an uplink transmission direction or a downlink transmission direction. In terms of a flexible subframe, different TDD subframe configurations in the subframe may be corresponding to different transmission directions. For example, one TDD subframe configuration in the subframe is uplink transmission, and another TDD subframe configuration in the subframe may be downlink transmission.

A greatest challenge posed by a dynamic TDD subframe configuration of each cell to network interference management is inter-cell interference. Particularly, in a dense network deployment scenario, there is a small difference between transmit power of a base station serving a cell and transmit power of user equipment. As a result, neighboring-cell uplink transmission greatly interferes with serving-cell downlink transmission and neighboring-cell downlink transmission greatly interferes with serving-cell downlink transmission.

SUMMARY

Embodiments of the present invention provide a downlink interference management method, so as to resolve a problem that neighboring-cell transmission interferes with a serving-cell downlink transmission.

A first aspect of the embodiments of the present invention provides a downlink interference management method. A serving base station obtains downlink interference overload information. The downlink interference overload information is used to indicate an interfered-with transmission resource of first user equipment. The serving base station sends the downlink interference overload information to a neighboring-cell base station. The neighboring-cell base station receives the downlink interference overload information, and performs, based on the downlink interference overload information, interference coordination on the transmission resource indicated in the downlink interference overload information.

In this technical solution, the downlink interference overload information sent by the serving base station to the neighboring-cell base station may indicate that the downlink transmission resource of the first user equipment is interfered with, and the neighboring-cell base station may perform interference coordination on the interfered-with transmission resource after receiving the downlink interference overload information. In this way, interference to the downlink transmission resource of the first user equipment can be reduced or eliminated by performing interference coordination by the neighboring-cell base station, thereby resolving a problem that neighboring-cell transmission interferes with downlink transmission of a current serving cell.

In a first possible implementation of the first aspect, the downlink interference overload information includes associated subframe information, and the associated subframe information indicates an identifier of an interfered-with subframe of the first user equipment.

With reference to the first possible implementation of the first aspect, in a second possible implementation, the downlink interference overload information includes a downlink interference overload indication list, and the downlink interference overload indication list includes an identifier of an interfered-with physical resource block in the subframe, indicated in the associated subframe information, of the first user equipment.

In this technical solution, the downlink interference overload indication list includes the identifier of the specific interfered-with physical resource block in the interfered-with subframe, so that the neighboring-cell base station can more accurately coordinate and schedule transmission resources.

With reference to the second possible implementation of the first aspect, in a third implementation, the downlink interference overload indication list includes an interference degree identifier of each physical resource block of the first user equipment.

In this technical solution, the downlink interference overload indication list includes the interference degree identifier of each physical resource block, so that the neighboring-cell base station performs differential interference coordination based on different interference degrees.

With reference to any one of the first aspect, or the first or the second possible implementation of the first aspect, in a fourth possible implementation, the serving base station sends, to the first user equipment, an interference measurement indication used to control the first user equipment to perform interference measurement, where the downlink interference overload information is obtained based on a result of the interference measurement.

A second aspect provides another downlink interference management method. A neighboring-cell base station receives downlink interference overload information from a serving base station. The downlink interference overload information is used to indicate an interfered-with transmission resource of first user equipment. The neighboring-cell base station performs, based on the downlink interference overload information, interference coordination on the transmission resource indicated in the downlink interference overload information.

In this technical solution, the downlink interference overload information received by the neighboring-cell base station may indicate that the downlink transmission resource of the first user equipment is interfered with, and the neighboring-cell base station may perform interference coordination on the interfered-with transmission resource after receiving the downlink interference overload information. This can reduce or eliminate interference to the downlink transmission resource of the first user equipment, thereby resolving a problem that transmission in a cell served by the neighboring-cell base station interferes with serving-cell downlink transmission.

In a first possible implementation of the second aspect, the downlink interference overload information includes associated subframe information, and the associated subframe information indicates an identifier of an interfered-with subframe of the first user equipment.

With reference to the second aspect or the first possible implementation of the second aspect, in a second possible implementation, the neighboring-cell base station searches for, based on the downlink interference overload information, a transmission resource, occupied by the neighboring-cell base station to send data, in the transmission resource corresponding to the downlink interference overload information, and performs interference coordination for the neighboring-cell base station.

With reference to the second aspect or the first possible implementation of the second aspect, in a third possible implementation, the neighboring-cell base station searches, based on the downlink interference overload information, a cell corresponding to the neighboring-cell base station for at least one second user equipment that occupies the transmission resource corresponding to the downlink interference overload information to send data; and performs interference coordination for the second user equipment.

A third aspect provides a base station. The base station includes a processor, a memory, and a communications interface. The processor is connected to the memory and the communications interface. For example, the processor may be connected to the memory and the communications interface by using a bus. The communications interface is configured to: communicate with first user equipment or a neighboring-cell base station, and send/receive the messages in the foregoing method to/from the first user equipment or the neighboring-cell base station. The memory is configured to store downlink interference overload information. The processor is configured to perform a part or all of the procedure in the first aspect.

A fourth aspect provides another base station. The base station is a serving base station, including a processing module and a sending module. The base station implements a part or all of the method in the first aspect by using the foregoing modules.

A fifth aspect provides a computer storage medium. The computer storage medium stores a program, and the program is used to perform some or all of the steps in the first aspect.

A sixth aspect further provides a base station. The base station includes a processor, a memory, and a communications interface. The processor is connected to the memory and the communications interface. For example, the processor may be connected to the memory and the communications interface by using a bus. The communications interface is configured to: communicate with second user equipment or a serving base station, and send/receive the messages in the foregoing method to/from the second user equipment or the serving base station. The memory is configured to store downlink interference overload information. The processor is configured to perform a part or all of the procedure in the second aspect.

A seventh aspect further provides another base station. The base station is a neighboring-cell base station, including a processing module and a receiving module. The base station implements a part or all of the method in the second aspect by using the foregoing modules.

An eighth aspect provides a computer storage medium. The computer storage medium stores a program, and the program is used to perform some or all of the steps in the second aspect.

A ninth aspect provides user equipment. The user equipment includes a receiver, a controller/processor, and a transmitter. The receiver is configured to receive a measurement indication from a base station. The processor is configured to: perform interference measurement in response to the measurement indication; determine, based on a result of the interference measurement, whether a transmission resource of the user equipment is interfered with; and generate downlink interference indication information when determining that the transmission resource is interfered with, where the downlink interference indication information is used to indicate information about an interfered-with subframe and an interfered-with physical resource block in the subframe in the transmission resource of the user equipment. The transmitter is configured to: send the downlink interference indication information to the base station, so that the base station obtains downlink interference overload information based on the downlink interference indication information, where the downlink interference overload information is used to inform the base station of the interfered-with transmission resource of the user equipment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Herein, some basic concepts in various embodiments of the present invention are first described.

A serving base station in the embodiments of the present invention includes an evolved NodeB (eNB) in LTE, a base transceiver station (BTS) in GSM or CDMA, a NodeB (NB) in WCDMA, or a network device (for example, a controller) in a future communications system such as 5G.

User equipment in the embodiments of the present invention includes first user equipment and second user equipment, specifically including a cellphone, a smartphone, a computer, a tablet computer, a personal digital assistant (PDA), a mobile Internet device (MID), a wearable device, an e-book reader, and the like.

In the embodiments of the present invention, the serving base station (referred to as "first base station" below) and a neighboring-cell base station (referred to as "second base station" below) respectively control two neighboring cells. In other words, the first base station is a neighboring-cell base station of the second base station, and vice versa. Two neighboring cells are not limited to proximity in geographical locations. If communication in one cell has impact, such as interference, on communication of the other cell, the two cells may be considered as neighboring cells. A cell may have a plurality of neighboring cells, and therefore a base station corresponding to the cell may also have a plurality of neighboring-cell base stations.

The technical solutions in the embodiments of the present invention are applicable to various communications systems, and preferably applicable to various communications systems in a dense network deployment scenario, such as Global System for Mobile Communications (GSM), a Code Division Multiple Access (CDMA) system, a Wideband Code Division Multiple Access (WCDMA) system, and a Long Term Evolution (LTE) system. The following uses the LTE system as an example.

The following describes the embodiments of the present invention with reference to the accompanying drawings.

Figure 1:
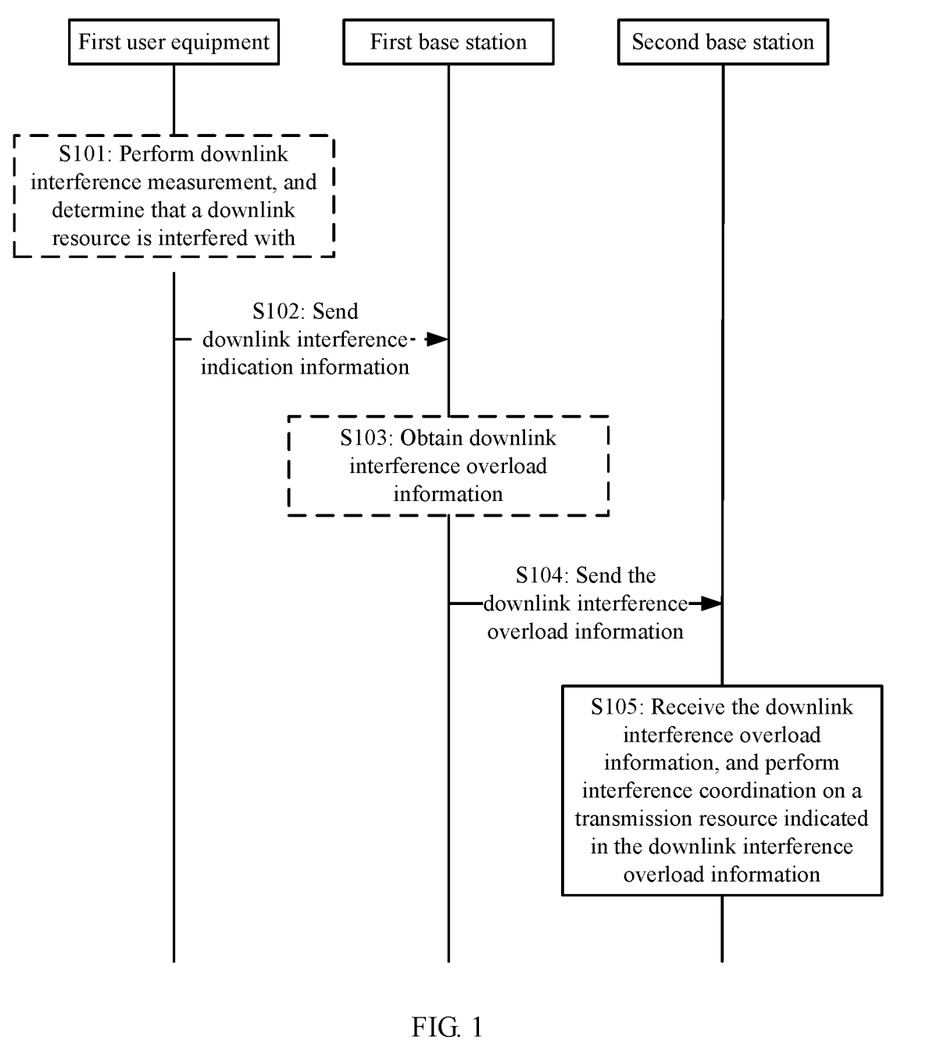
FIG. 1 is a schematic flowchart of a downlink interference management method according to an embodiment of the present invention.

FIG. 1 is a simplified schematic diagram of a downlink interference management method according to an embodiment of the present invention. The downlink interference management method is applied to interference coordination between a base station of a cell serving at least one first user equipment and a neighboring-cell base station of the cell. Interaction between a base station of a cell serving first user equipment (referred to as "first base station" below) and a neighboring-cell base station of the cell (referred to as "second base station" below) is used as an example for description in this embodiment. It can be understood that when there are a plurality of neighboring-cell base stations, interaction procedures between base stations and neighboring-cell base stations are similar, and when there are a plurality of user equipments in a cell, interaction procedures between user equipments and corresponding base stations are similar. Therefore, details are not described. The downlink interference management method includes the following steps.

Step S103: The first base station obtains downlink interference overload information, where the downlink interference overload information is used to indicate an interfered-with transmission resource of the first user equipment.

The downlink interference overload information is used to indicate the interfered-with transmission resource in a downlink transmission resource occupied by the at least one first user equipment in the cell served by the first base station. It should be noted that the transmission resource herein may be at least one transmission subframe or at least one physical resource block in at least one transmission subframe.

In some implementation scenarios, the downlink interference overload information may include associated subframe information, and the associated subframe information indicates an identifier of an interfered-with subframe of the first user equipment. The identifier of the subframe can uniquely identify the subframe, such as the subframe number. The associated subframe information may indicate an identifier of an interfered-with transmission subframe. In other words, the associated subframe information may indicate a specific interfered-with subframe in the downlink transmission resource occupied by the first user equipment.

Further, the downlink interference overload information may further include a downlink interference overload indication list, and the downlink interference overload indication list includes an identifier of an interfered-with physical resource block in the subframe, indicated in the associated subframe information, of the first user equipment. Specifically, one subframe may include a plurality of physical resource blocks, and some or all of the physical resource blocks in the subframe may be interfered with. Therefore, the downlink interference overload indication list is used to further indicate an identifier of a specific interfered-with physical resource block in the interfered-with subframe, that is, to specifically indicate the interfered-with physical resource block in the interfered-with subframe.

In this way, the first base station can determine, based on the associated subframe information and/or the downlink interference overload indication list, the identifier of the interfered-with subframe in the downlink transmission subframe of the first user equipment or the identifier of the interfered-with physical resource block in the downlink transmission subframe. For example, if the associated subframe information indicates a subframe 5, the first base station can determine that the downlink subframe 5 is interfered with. For another example, if the associated subframe information indicates a subframe 5 and the downlink interference overload indication list is listed in Table 1, the first base station can determine that physical resource blocks 3, 4, 5, and 6 in the downlink subframe 5 are interfered with.

TABLE 1

Downlink interference overload indication list (example)
Identifier of an interfered-with
physical resource block (example)

| |
|---|
| 3 |
| 4 |
| 5 |
| 6 |

During specific implementation, the first base station may obtain the downlink interference overload information in the following manner: The first base station monitors channel quality of the downlink transmission resource of the first user equipment, and obtains the downlink interference overload information when detecting that, for example, the channel quality significantly deteriorates within a short period of time; or the first user equipment may perform interference measurement on the transmission resource, and sends downlink interference indication information to the first base station when a result of the interference measurement indicates that the measured transmission resource is interfered with, and the first base station determines the downlink interference overload information based on the downlink interference indication information.

Optionally, as shown in FIG. 1, the downlink interference management method may further include step S101 and step S102.

Step S101: The first user equipment performs interference measurement; and determines, based on a result of the interference measurement, whether a transmission resource is interfered with. When the transmission resource is interfered with, step S102 is performed.

Interference measurement performed by the first user equipment may be started by the first user equipment or triggered by a program such as an application program in the first user equipment; may be triggered by the first base station when the first base station sends, to the first user equipment, an interference measurement indication used to control the first user equipment to perform interference measurement; or may be periodically triggered by the first user equipment according to a measurement period obtained or set in advance. Optionally, the first user equipment may perform interference measurement according to an interference measurement period. For example, the interference measurement period may be two hours, and the first user equipment may perform interference measurement once every two hours.

For example, the interference measurement may be performed in either of the following manners:

Measurement manner 1: The first user equipment may perform interference measurement on all or some of occupied transmission resources. Herein, the transmission resources occupied by the first user equipment may have been obtained by the first user equipment when the first base station allocates the downlink transmission resource to the first user equipment. When the first user equipment performs interference measurement on some transmission resources, the some transmission resources may be designated by the first user equipment in advance. For example, the first user equipment may designate to perform interference measurement on a physical resource block in a subframe occupied for downlink transmission.

Measurement manner 2: The interference measurement indication sent by the first base station to the first user equipment may include an identifier of a to-be-measured transmission resource. To be specific, the interference measurement indication instructs the first user equipment to perform interference measurement on the transmission resource corresponding to the identifier of the to-be-measured transmission resource. The identifier of the to-be-measured transmission resource may be a number or a name of the to-be-measured transmission resource.

During interference measurement, the first user equipment may obtain the result of the interference measurement based on signal strength of a wanted signal and an interference signal that are received over a transmission link, channel quality of the serving base station and the neighboring-cell base station that serve the first user equipment, and other parameters. After obtaining the result of the interference measurement, the first user equipment may determine, based on the measurement result, whether the measured transmission resource is interfered with.

Specifically, the first user equipment may compare link interference obtained through measurement with an interference threshold. If the link interference is greater than the interference threshold, the first user equipment determines that the transmission resource is interfered with. For example, when the interference threshold is set to −70 dBm, and the link interference obtained through measurement is −65 dBm, the first user equipment determines that the transmission resource is interfered with. For example, the interference threshold may be preset by the first user equipment, or may be obtained according to an instruction sent by another device to the first user equipment. For example, the interference threshold may be included in the interference measurement indication sent by the first base station to the first user equipment.

Step S102: The first user equipment sends downlink interference indication information to the first base station.

After determining that the transmission resource is interfered with, the first user equipment sends the downlink interference indication information to the first base station. The downlink interference indication information is used to inform the first base station that the transmission resource occupied by the first user equipment is interfered with.

During specific implementation, the downlink interference indication information may carry a first user equipment identifier or an identifier of an interfered-with transmission resource. The first user equipment identifier is an identifier that can identify the first user equipment, such as a Media Access Control (MAC) address of the first user equipment. The identifier of the interfered-with transmission resource is an identifier used to identify the interfered-with downlink transmission resource. For example, the identifier may be the interfered-with subframe number and/or the physical resource block number in the interfered-with subframe.

Optionally, in the implementation scenario including step S101 and step S102, step S103 may be as follows:

The first base station receives the downlink interference indication information, obtains the identifier of the interfered-with transmission resource of the first user equipment based on the downlink interference indication information, and determines the downlink interference overload information.

The first base station may obtain the identifier of the interfered-with transmission resource of the first user equipment when receiving the downlink interference indication information. Corresponding to step S102, the first base station may obtain the identifier of the interfered-with transmission resource of the first user equipment in either of the following manners.

Obtaining manner 1: When the downlink interference indication information carries the first user equipment identifier, the first base station may obtain a transmission resource identifier of a downlink transmission resource pre-allocated to the first user equipment corresponding to the first user equipment identifier, and use the transmission resource identifier as the identifier of the interfered-with transmission resource.

Step S104: The first base station sends the downlink interference overload information to the second base station, to request the second base station to perform interference coordination on the transmission resource.

Herein, the downlink interference overload information may be used to inform the second base station of the interfered-with transmission resource, to request the second base station to perform interference coordination.

It should be noted that the following inter-base-station interface information needs to be defined in the existing 3GPP specification to carry the downlink interference overload information. For example, an information element of the downlink interference overload information (DL Interference Overload Info) in a line of "DL interference overload info" listed in Table 2 may be added to a "load information" message in the 3GPP TS 36.423 specification.

TABLE 2

Load information (example)

| IE/Group name | Presence | Range | IE type and reference | Semantics description | Criticality | Assigned criticality |
|---|---|---|---|---|---|---|
| Message type | M | | 9.2.13 | | Yes | Ignore |
| Cell information | M | | | | Yes | Ignore |
| >Cell information item | | 1 . . . <maxCellineNB> | | | Each | Ignore |
| >>Cell ID | M | | ECGI 9.2.14 | ID of the source cell | — | — |
| >>UL interference overload indication | O | | 9.2.17 | | — | — |
| >>UL high interference information | | 0 . . . <maxCellineNB> | | | — | — |
| >>>Target cell ID | M | | ECGI 9.2.14 | ID of the cell for which the HII is meant | — | — |
| >>>UL high interference indication | M | | 9.2.18 | | — | — |
| >>Relative narrowband Tx power (RNTP) | O | | 9.2.19 | | — | — |
| >>ABS information | O | | 9.2.54 | | Yes | Ignore |
| >>Invoke indication | O | | | | Yes | Ignore |
| >>Intended UL-DL configuration | O | | ENUMERATED (sa0, sa1, sa2, sa3, sa4, sa5, sa6, . . .) | One of the UL-DL configurations defined in TS 36.211 [10]. The UL subframe(s) in the indicated configuration is subset of those in SIB1 UL-DL configuration. This IE applies to TDD only. | Yes | Ignore |
| >>DL interference overload Info | O | | | This IE applies to TDD only. | Yes | Ignore |
| >>Extended UL interference overload info | O | | 9.2.67 | This IE applies to TDD only. | Yes | Ignore |
| >>CoMP information | O | | 9.2.74 | | Yes | Ignore |
| >>Dynamic DL transmission information | O | | 9.2.77 | | Yes | Ignore |

Obtaining manner 2: When the downlink interference indication information carries the identifier of the interfered-with transmission resource, the first base station may obtain the identifier of the interfered-with transmission resource from the downlink interference indication information after receiving the downlink interference indication information.

Based on the identifier of the interfered-with transmission resource, the first base station may determine the interfered-with downlink transmission resource, that is, determine the downlink interference overload information.

The downlink interference overload information (DL Interference Overload Info) in Table 2 provides an information report on downlink interference overload corresponding to an application in a dynamic TDD mode. Specific information content of the downlink interference overload information (DL Interference Overload Info) in the example is listed in Table 3. Semantics description in the table mainly indicates a degree of downlink interference overload of each physical block in each subframe when associated subframes (associated subframes) are flexible subframes and these flexible subframes (for example, subframes #{13, 4, 7, 8, 9}) are used for downlink transmission (that is, a value is marked as "0").

TABLE 3

DL interference overload info (example)

| IE/Group name | Presence | Range | IE type and reference | Semantics description |
| --- | --- | --- | --- | --- |
| Associated subframes | M | | BITSTRING (SIZE(5)) | The set of subframe(s) to which the DL interference overload indication is applicable. The bitmap from the least significant bit position to the most significant bit position represents subframes #{3, 4, 7, 8, 9} in a radio frame. Value "0" in a bit position indicates that the DL interference overload indication is applicable to the corresponding subframe; and value "1" indicates otherwise. |
| DL interference overload indication list | | 1 ... <maxnoofPRBs> | | |
| >DL interference overload indication | M | | ENUMERATED (high interference, medium interference, low interference, ... ) | Each PRB is identified by its position in the list: the first element in the list corresponds to PRB 0, the second to PRB 1, etc. |

Step S105: The second base station receives the downlink interference overload information from the first base station, and performs interference coordination on the transmission resource indicated in the downlink interference overload information.

The interfered-with transmission resource is indicated in the downlink interference overload information, and after receiving the downlink interference overload information, the second base station may perform interference coordination on the interfered-with transmission resource indicated in the downlink interference overload information. Specifically, the second base station may detect whether the second base station or second user equipment controlled by the second base station occupies the transmission resource corresponding to the downlink interference overload information to send data. If detecting that the second base station occupies the transmission resource to perform downlink transmission, the second base station may perform interference coordination for the second base station, for example, reduce downlink transmit power of the second base station, stop occupying the interfered-with transmission resource, or re-schedule a downlink transmission resource for downlink transmission for which the interfered-with transmission resource is occupied. If detecting at least one second user equipment occupying the transmission resource corresponding to the downlink interference overload information to perform uplink transmission, the second base station may perform interference coordination for the second user equipment, for example, reduce uplink transmit power of the second user equipment or re-schedule another uplink transmission resource to the second user equipment.

Optionally, the downlink interference overload information includes the associated subframe information, namely, the identifier of the interfered-with subframe of the first user equipment, and the second base station may determine, based on the identifier of the subframe, the second base station or the second user equipment that occupies the subframe corresponding to the identifier of the subframe, and perform interference coordination. Further, the downlink interference overload information may further include the downlink interference overload indication list, and the downlink interference overload indication list includes an identifier of an interfered-with physical resource block in the subframe, indicated in the associated subframe information, of the first user equipment. In this case, the second base station may alternatively determine, based on the identifier of the interfered-with physical resource block in the subframe, the second base station or the second user equipment that occupies the physical resource block corresponding to the identifier of the physical resource block, and perform interference coordination.

In some implementation scenarios, before performing interference coordination, the second base station may determine whether data is transmitted on the transmission resource corresponding to the downlink interference overload information, and if data is transmitted, it indicates that the transmission resource is being occupied, and the second base station may perform interference coordination on the transmission resource.

In some other implementation scenarios, after determining that data is transmitted on the transmission resource corresponding to the downlink interference overload information, the second base station may further determine whether a path loss between the second base station and the first base station is less than a preset path loss threshold. The path loss is a radio signal loss in a propagation process. If the path loss between the second base station and the first base station is less than the path loss threshold, that is, the radio signal loss between the first base station and the second base station in the propagation process is less than the path loss threshold, the second base station may perform interference coordination on the transmission resource.

It should be noted that the method for performing coordination for the second user equipment is applicable to a scenario in which the interfered-with transmission resource is in a flexible subframe and a serving cell performs downlink transmission in the subframe and a neighboring cell performs uplink transmission in the subframe. Therefore, the second base station performs interference coordination on second user equipment occupying the transmission resource to perform uplink transmission.

The method for performing coordination on the second base station is applicable to a scenario in which an interfered-with transmission resource is in a fixed subframe or a flexible subframe and both a serving cell and a neighboring cell perform downlink transmission in the subframe. Therefore, the second base station performs interference coordination on the second base station occupying the transmission resource to perform downlink transmission.

In the embodiment in FIG. 1, the interfered-with transmission resource is indicated in the downlink interference overload information sent by the first base station to the second base station, and the second base station may determine, by using the downlink interference overload information, a transmission resource and a device that cause interference to the interfered-with transmission resource, so as to perform interference coordination based on a configuration of the base station. This reduces or eliminates interference to the first user equipment, thereby resolving a problem that interference-cell transmission interferes with interfered-with cell downlink transmission.

Figure 2:
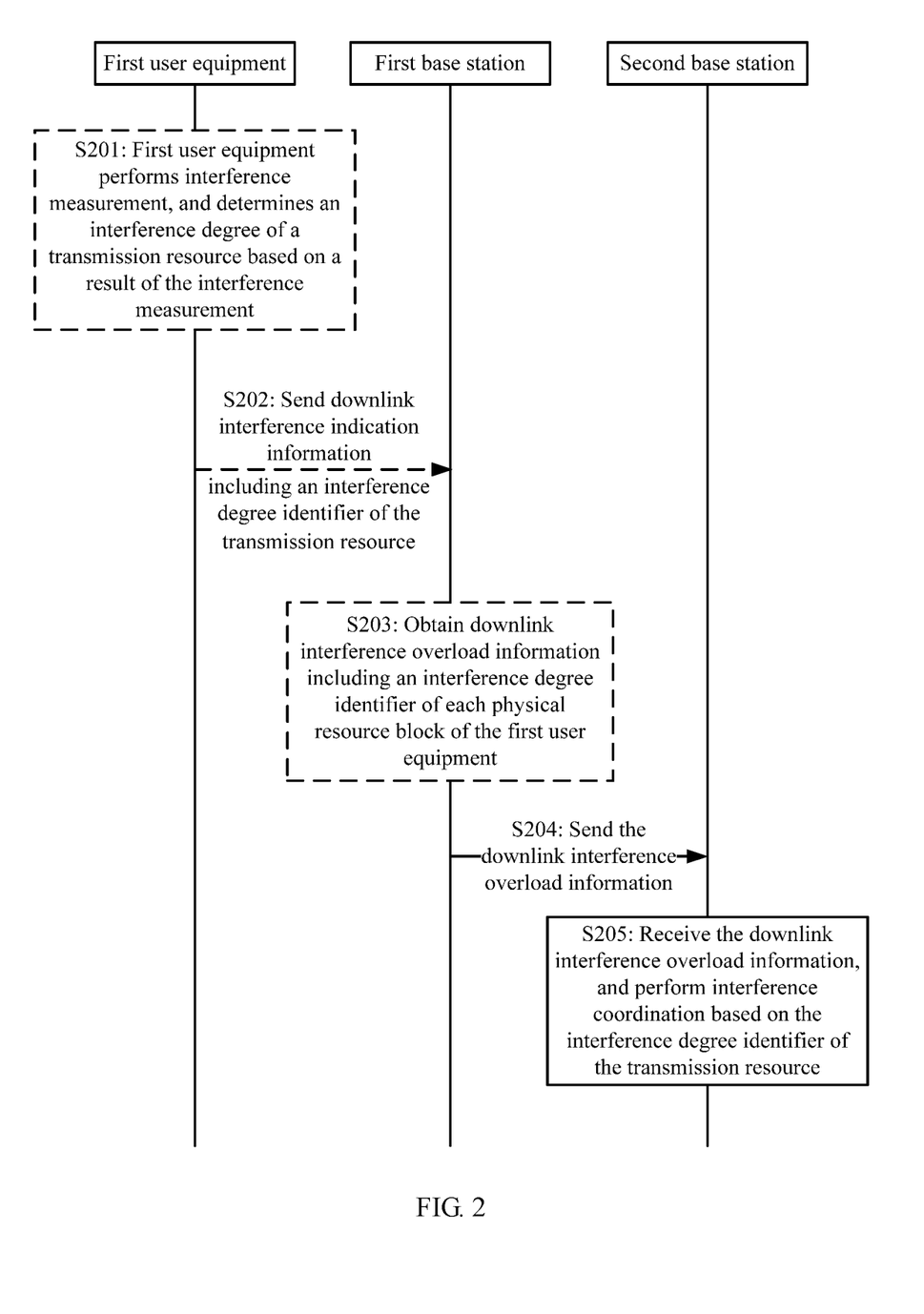
FIG. 2 is a schematic flowchart of another downlink interference management method according to an embodiment of the present invention.

FIG. 2 is a schematic flowchart of another downlink interference management method according to an embodiment of the present invention. As shown in FIG. 2, the method includes the following steps.

Step S203: A first base station obtains downlink interference overload information, where the downlink interference overload information includes an interference degree identifier of each physical resource block of first user equipment, and the interference degree identifier is used to indicate an interference degree corresponding to an interfered-with transmission resource of the first user equipment.

In this embodiment, the downlink interference overload information includes a downlink interference overload indication list, and the downlink interference overload indication list includes an identifier of an interfered-with physical resource block in a subframe, indicated in associated subframe information, of the first user equipment, and the interference degree identifier of each physical resource block of the first user equipment. For example, interference degrees may include low interference, medium interference, and high interference. The downlink interference overload indication list is listed in Table 4, and interference degree identifiers may be 1, 2, and 3, representing low interference, medium interference, and high interference, respectively.

TABLE 4

Downlink interference overload indication list (example)

| Identifier of an interfered-with physical resource block (example) | Interference degree identifier (example) |
|---|---|
| 3 | 1 |
| 4 | 1 |
| 5 | 2 |
| 6 | 3 |

Optionally, as shown in FIG. 2, the downlink interference management method may further include the following steps.

Step S201: The first user equipment performs interference measurement, and determines the interference degree of the transmission resource based on a result of the interference measurement.

Specifically, a plurality of link interference intervals and an interference degree corresponding to each link interference interval may be obtained in advance. The first user equipment may determine a link interference interval to which measured link interference corresponding to the downlink transmission resource belongs, so as to determine an interference degree corresponding to the link interference interval. For example, the link interference interval and the corresponding interference degree may be preset by the first user equipment, or may be obtained according to an instruction sent by another device to the first user equipment.

In some embodiments, the interference degrees may be classified into three levels: low interference, medium interference, and high interference, and may be represented by three interference degree identifiers, respectively. The interference degree of the transmission resource may be determined based on a correspondence between a link interference interval and an interference degree. For example, it is assumed that the correspondence between a link interference interval and an interference degree is listed in Table 5, and interference degree identifies 1, 2, and 3 in Table 5 represent low interference, medium interference, and high interference, respectively. If the measured link interference corresponding to the downlink transmission resource is −65 dBm, the first user equipment may determine that an interference degree identifier of the transmission resource is 1, that is, the interference degree is low interference.

TABLE 5

Schematic table of the correspondence between a link interference interval and an interference degree (example)

| Link interference interval (dBm) | Interference degree identifier (example) |
|---|---|
| −70 to −61 | 1 |
| −60 to −51 | 2 |
| −50 to −41 | 3 |

Step S202: The first user equipment sends downlink interference indication information to the first base station, where the downlink interference indication information includes the interference degree identifier of the transmission resource.

The downlink interference indication information may carry the identifier of the interference degree, determined in step S201, of the interfered-with transmission resource.

Optionally, in the implementation scenario including step S201 and step S202, step S203 may be as follows:

The first base station receives the downlink interference indication information, obtains the identifier of the interfered-with transmission resource and the interference degree identifier of the first user equipment based on the downlink interference indication information, and determines the downlink interference overload information.

When receiving the downlink interference indication information, the first base station may obtain the identifier of the interfered-with transmission resource and the interference degree identifier of the interfered-with transmission resource of the first user equipment. Specifically, the interfered-with transmission resource may be a subframe, the identifier of the interfered-with transmission resource is the identifier of the interfered-with physical resource block in the interfered-with subframe, and the degree identifier is the interference degree identifier of each physical resource block. In this way, the downlink interference overload information is determined.

Step S204: The first base station sends the downlink interference overload information to a second base station, to request the second base station to perform interference coordination based on the interference degree identifier of the transmission resource.

Herein, the downlink interference overload information may be used to inform the second base station of the interfered-with downlink transmission resource and the interference degree identifier of the interfered-with transmission resource, to request the second base station to perform interference coordination on the interfered-with transmission resource based on the interference degree identifier.

For example, specific information content of the downlink interference overload information (DL Interference Overload Info) listed in Table 3 may further indicate a specific interference degree of each resource block in each subframe when associated subframes (associated subframes) are flexible subframes and these flexible subframes (for example, subframes #{3, 4, 7, 8, 9}) are used for downlink transmission (that is, a value is marked as "0").

Step S205: The second base station receives the downlink interference overload information from the first base station, and performs interference coordination based on the interference degree identifier of the transmission resource.

The interfered-with transmission resource and the interference degree identifier of the transmission resource are indicated in the downlink interference overload information, and after receiving the downlink interference overload information, the second base station may perform, based on the interference degree identifier of the transmission resource, interference coordination on the interfered-with transmission resource indicated in the downlink interference overload information. For example, interference degree identifiers may be 1, 2, and 3, representing low interference, medium interference, and high interference, respectively. In this case, the second base station may perform different interference coordination operations based on different degree identifiers.

For example, when interference coordination is being performed for second user equipment, and the interference degree identifier is 1, that is, the interference degree is low interference, the second base station may reduce uplink transmit power of the second user equipment; when the interference degree identifier is 2, that is, the interference degree is medium interference, the second base station may reconfigure an uplink transmission resource for the second user equipment; or when interference degree identifier is 3, that is, the interference degree is high interference, the second base station may reconfigure an uplink transmission resource for the second user equipment and stop using a current uplink transmission resource.

For another example, when interference coordination is being performed for the second base station, and the interference degree identifier is 1, that is, the interference degree is low interference, the second base station may reduce downlink transmit power of the base station; when the interference degree identifier is 2, that is, the interference degree is medium interference, the second base station may re-schedule a downlink transmission resource for downlink transmission for which the downlink transmission resource is occupied; or when the interference degree identifier is 3, that is, the interference degree is high interference, the second base station may stop using the downlink transmission resource.

In the embodiment in FIG. 2, the interfered-with transmission resource and the interference degree identifier of the transmission resource are indicated in the downlink interference overload information sent by the first base station to the second base station, so that the second base station not only can determine, by using the downlink interference overload information, a transmission resource and a device that cause interference to the interfered-with transmission resource, but also can use differential interference coordination methods based on the interference degree identifier of the transmission resource. In this way, interference to the first user equipment is reduced to some extent or eliminated, thereby resolving a problem that interference-cell transmission interferes with interfered-with cell downlink transmission.

Figure 3:
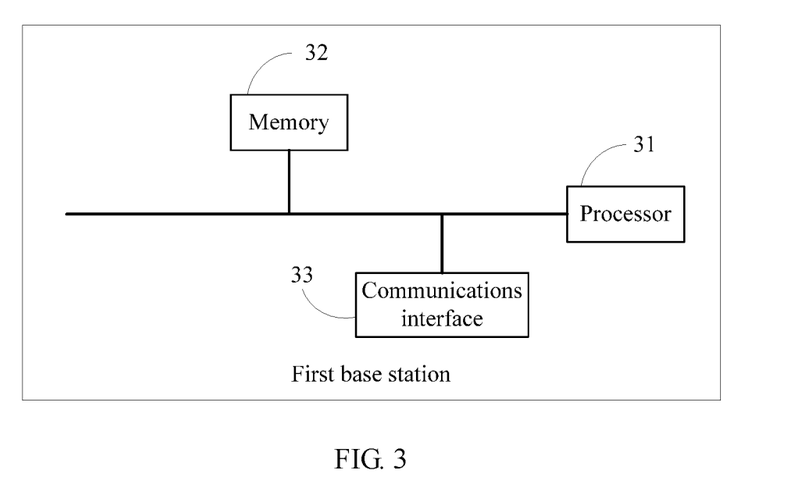
FIG. 3 is a schematic structural diagram of a first base station according to an embodiment of the present invention.

FIG. 3 is a schematic structural diagram of a first base station according to an embodiment of the present invention. As shown in FIG. 3, the first base station includes a processor 31, a memory 32, and a communications interface 33. The processor 31 is connected to the memory 32 and the communications interface 33. For example, the processor 31 may be connected to the memory 32 and the communications interface 33 by using a bus.

The processor 31 is configured to support the first base station in performing the corresponding functions in the foregoing method. The processor 31 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 32 is configured to store downlink interference overload information, an identifier of an interfered-with downlink resource, and the like. The memory 32 may include a volatile memory such as a random-access memory (RAM). The memory 32 may alternatively include a non-volatile memory such as a read-only memory (ROM), a flash memory, a hard disk drive (HDD), or a solid-state drive (SSD). The memory 32 may alternatively include a combination of the foregoing types of memories.

The communications interface 33 is configured to: establish a wireless connection to a second base station and first user equipment, and send/receive the messages in the foregoing method to/from the second base station and the first user equipment.

The processor 31 may perform the following operations:
obtaining downlink interference overload information, where the downlink interference overload information is used to indicate an interfered-with transmission resource of the first user equipment; and sending the downlink interference overload information to the neighboring-cell base station by using the communications interface 33, so that the neighboring-cell base station performs interference coordination on the transmission resource.

Further, before obtaining the downlink interference overload information, the processor 31 further sends, to the first user equipment by using the communications interface 33, an interference measurement indication used to control the first user equipment to perform interference measurement, where the downlink interference overload information is obtained based on a result of the interference measurement.

Figure 4:
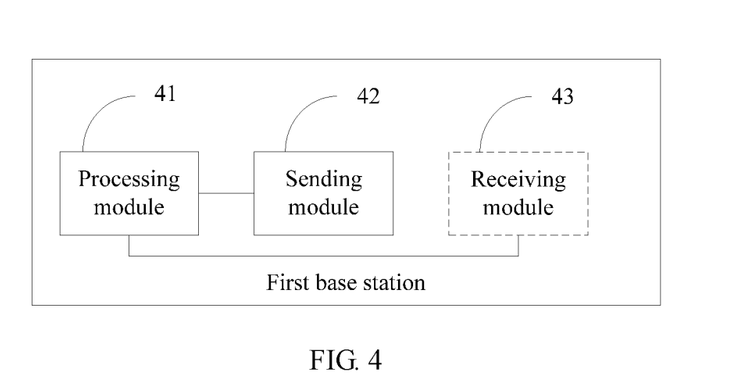
FIG. 4 is a schematic structural diagram of another first base station according to an embodiment of the present invention.

FIG. 4 is a schematic structural diagram of another first base station according to an embodiment of the present invention. As shown in FIG. 4, the first base station includes a processing module 41 and a sending module 42.

The processing module 41 is configured to obtain downlink interference overload information, where the downlink interference overload information is used to indicate an interfered-with transmission resource of first user equipment.

The sending module 42 is configured to send the downlink interference overload information to a neighboring-cell base station, so that the neighboring-cell base station performs interference coordination on the transmission resource.

Optionally, the downlink interference overload information includes associated subframe information, and the associated subframe information indicates an identifier of an interfered-with subframe of first user equipment.

Optionally, the downlink interference overload information includes a downlink interference overload indication list, and the downlink interference overload indication list includes an identifier of an interfered-with physical resource block in the subframe, indicated in the associated subframe information, of the first user equipment.

Optionally, the downlink interference overload indication list includes an interference degree identifier of each physical resource block of the first user equipment.

Optionally, the sending module 42 is further configured to send, to the first user equipment, an interference measurement indication used to control the first user equipment to perform interference measurement, where the downlink interference overload information is obtained based on a result of the interference measurement.

The first base station further includes a receiving module 43, configured to receive the downlink interference overload information.

It should be noted that the foregoing modules (the processing module 41, the sending module 42, and the receiving module 43) are configured to perform the methods described in the method embodiments shown in FIG. 1 and FIG. 2, where the processing module 41 implements the functions of the processor 31 shown in FIG. 3, and the sending module 42 and the receiving module 43 implement the functions of the communications interface 33 shown in FIG. 3.

Figure 5:
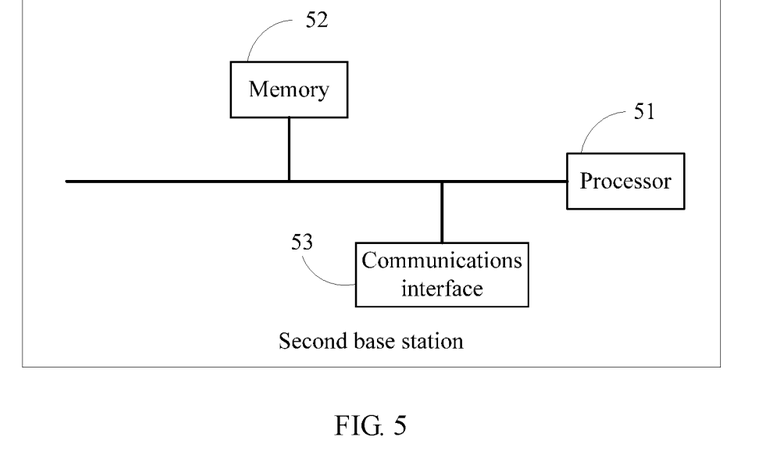
FIG. 5 is a schematic structural diagram of a second base station according to an embodiment of the present invention.

FIG. 5 is a schematic structural diagram of a second base station according to an embodiment of the present invention. As shown in FIG. 5, the second base station includes a processor 51, a memory 52, and a communications interface 53. The processor 51 is connected to the memory 52 and the communications interface 53. For example, the processor 51 may be connected to the memory 52 and the communications interface 53 by using a bus.

The processor 51 is configured to support the second base station in performing the corresponding functions in the foregoing method. The processor 51 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 52 is configured to store downlink interference overload information, an identifier of an interfered-with downlink resource, and the like. The memory 52 may include a volatile memory such as a random-access memory (RAM). The memory 52 may alternatively include a non-volatile memory such as a read-only memory (ROM), a flash memory, a hard disk drive (HDD), or a solid-state drive (SSD). The memory 52 may alternatively include a combination of the foregoing types of memories.

The communications interface 53 is configured to establish a wireless connection to a first base station and second user equipment, and send/receive the messages in the foregoing methods to/from the first base station and the second user equipment.

The processor 51 may perform the following operations:

receiving downlink interference overload information from the serving base station by using the communications interface 53, where the downlink interference overload information is used to indicate an interfered-with transmission resource of the first user equipment; and performing, based on the downlink interference overload information, interference coordination on the transmission resource indicated in the downlink interference overload information.

Optionally, the processor 51 searches for, based on the downlink interference overload information, a transmission resource, occupied by the neighboring-cell base station to send data, in the transmission resource corresponding to the downlink interference overload information; and performs interference coordination for the neighboring-cell base station.

Optionally, the processor 51 searches, based on the downlink interference overload information, a cell corresponding to the neighboring-cell base station for at least one second user equipment that occupies the transmission resource corresponding to the downlink interference overload information to send data; and performs interference coordination for the second user equipment.

Figure 6:
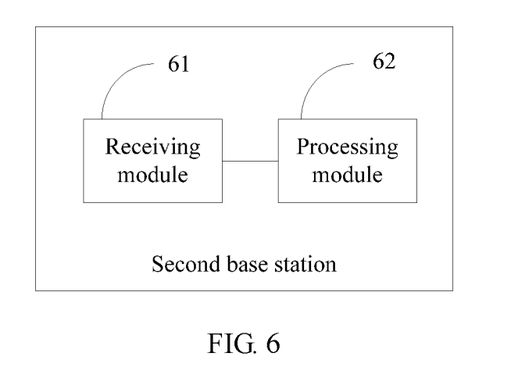
FIG. 6 is a schematic structural diagram of another second base station according to an embodiment of the present invention.

FIG. 6 is a schematic structural diagram of another second base station according to an embodiment of the present invention. As shown in FIG. 6, the second base station includes a receiving module 61 and a processing module 62.

The receiving module 61 is configured to receive downlink interference overload information from a serving base station, where the downlink interference overload information is used to indicate an interfered-with transmission resource of first user equipment.

The processing module 62 is configured to perform, based on the downlink interference overload information, interference coordination on the transmission resource indicated in the downlink interference overload information.

Optionally, the downlink interference overload information includes associated subframe information, and the associated subframe information indicates an identifier of an interfered-with subframe of the first user equipment.

Optionally, the processing module 62 is configured to:
search for, based on the downlink interference overload information, a transmission resource, occupied by the neighboring-cell base station to send data, in the transmission resource corresponding to the downlink interference overload information; and
perform interference coordination for the neighboring-cell base station.

Optionally, the processing module 62 is configured to:
search, based on the downlink interference overload information, a cell corresponding to the neighboring-cell base station for at least one second user equipment that occupies the transmission resource corresponding to the downlink interference overload information to send data; and perform interference coordination for the second user equipment.

It should be noted that the foregoing modules (the receiving module 61 and the processing module 62) are configured to perform the methods described in the method embodiments shown in FIG. 1 and FIG. 2, where the processing module 62 implements the functions of the processor 51 shown in FIG. 5, and the receiving module 61 implements the functions of the network interface 53 shown in FIG. 5.

Figure 7:
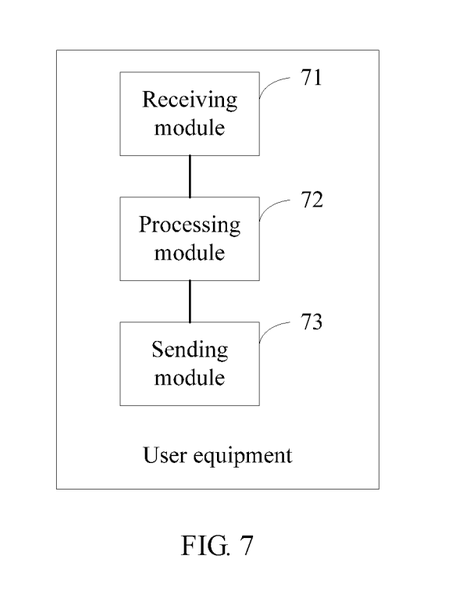
FIG. 7 is a schematic structural diagram of user equipment according to an embodiment of the present invention.

FIG. 7 is a schematic structural diagram of user equipment 70 according to an embodiment of the present invention. As shown in FIG. 7, the user equipment 70 includes a receiving module 71, a processing module 72, and a sending module 73.

The receiving module 71 is configured to receive a measurement indication from a base station. The measurement indication may be triggered by the base station based on a specific condition, or may be periodically sent by the base station.

The processing module 72 is configured to: perform interference measurement in response to the measurement indication, and determine, based on a result of the interference measurement, whether a transmission resource of the user equipment 70 is interfered with. When determining that the transmission resource is interfered with, the processing module 72 generates downlink interference indication information. The downlink interference indication information is used to indicate information about an interfered-with subframe and an interfered-with physical resource block in the subframe in the transmission resource of the user equipment 70. Interference measurement may be performed on all physical resource blocks in the transmission resource occupied by the user equipment 70, or may be performed on some physical resource blocks in the transmission resource occupied by the user equipment 70. Optionally, the downlink interference indication information includes associated subframe information, and the associated subframe information indicates an identifier of the interfered-with subframe of the user equipment. Optionally, the downlink interference indication information may further include a subframe indication list, and the subframe indication list includes an identifier of the interfered-with physical resource block in the subframe indicated in the associated subframe information. For a specific description of the interference indication information, refer to the descriptions of the foregoing step S101 and step S102. Details are not described herein again.

The sending module 73 is configured to send the downlink interference indication information to the base station, so that the base station obtains downlink interference overload information based on the downlink interference indication information. The downlink interference overload information is used to inform the base station of the interfered-with transmission resource of the user equipment. For a specific description of the interference overload information, refer to the description of the foregoing step S103. Details are not described herein again.

Figure 8:
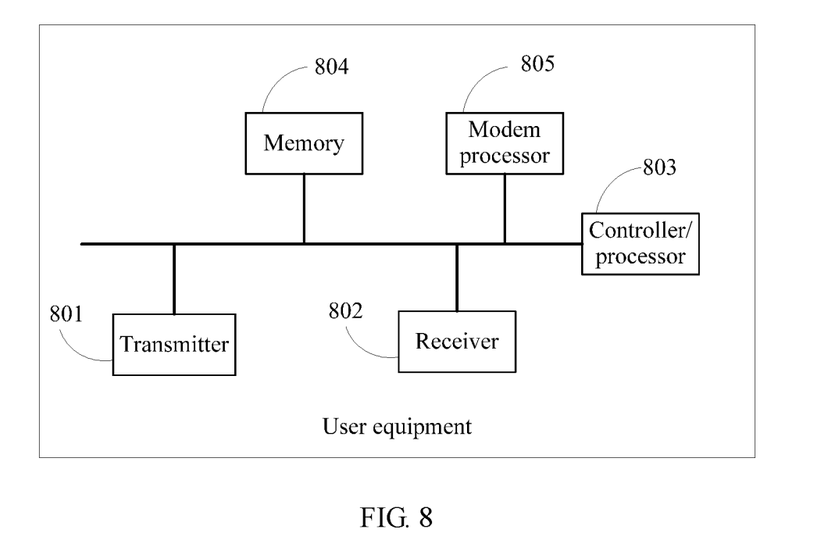
FIG. 8 is a schematic structural diagram of another user equipment according to an embodiment of the present invention.

FIG. 8 is a simplified schematic diagram of a possible design structure of user equipment 80 according to an embodiment of the present invention. The user equipment 80 includes a transmitter 801, a receiver 802, a controller/processor 803, a memory 804, and a modem processor 805.

The transmitter 801 adjusts (for example, performs digital-to-analog conversion, filtering, amplification, and up conversion on) an output sample and generates an uplink signal. The uplink signal is transmitted by an antenna to the base station in the foregoing embodiments. The antenna receives, over a downlink, a downlink signal transmitted by the base station in the foregoing embodiments. The receiver 802 adjusts (for example, performs filtering, amplification, down conversion, and digitalization on) the signal received from the antenna and provides an input sample. In the modem processor 805, an encoder 806 receives service data and a signaling message that are to be sent on an uplink, and processes (for example, formats, encodes, and interleaves) the service data and the signaling message. A modulator 807 further processes (for example, performs symbol mapping and modulation on) the encoded service data and signaling message and provides an output sample. A demodulator 809 processes (for example, demodulates) the input sample and provides symbol estimate. A decoder 808 processes (for example, de-interleaves and decodes) the symbol estimate and provides the decoded data and signaling message to be sent to the UE. The encoder 806, the modulator 807, the demodulator 809, and the decoder 808 may be implemented by the integrated modem processor 805. These units perform processing according to a radio access technology (such as an access technology used in LTE and other evolved systems) used by a radio access network.

The controller/processor 803 controls and manages an action of the user equipment 80 and is configured to perform processing implemented by the UE in the foregoing embodiments. For example, the controller/processor 803 is configured to: control the user equipment 80 to perform interference measurement based on a measurement indication from the base station, generate downlink interference indication information, and/or perform other processes in the technology described in the present invention.

For example, the receiver 802 is configured to receive the measurement indication from the base station. The controller/processor 803 is configured to support the user equipment in: performing interference measurement in response to the measurement indication, determining, based on a result of the interference measurement, whether a transmission resource of the user equipment is interfered with, and generating the downlink interference indication information when determining that the transmission resource is interfered with. The downlink interference indication information is used to indicate information about an interfered-with subframe and an interfered-with physical resource block in the subframe in the transmission resource of the user equipment. Optionally, the downlink interference indication information includes associated subframe information, and the associated subframe information indicates an identifier of the interfered-with subframe of the user equipment 80. Optionally, the downlink interference indication information may further include a subframe indication list, and the subframe indication list includes an identifier of the interfered-with physical resource block in the subframe indicated in the associated subframe information. For a specific description of the interference indication information, refer to the descriptions of the foregoing step S101 and step S102. Details are not described herein again. The transmitter 801 is configured to send the downlink interference indication information to the base station, so that the base station obtains downlink interference overload information based on the downlink interference indication information. For a specific description of the downlink interference overload information, refer to the description of the foregoing step S103. Details are not described herein again. The memory 804 is configured to store program code and data of the user equipment 80.

A person of ordinary skill in the art may understand that all or some of the processes of the methods in the embodiments may be implemented by a computer program instructing relevant hardware. The program may be stored in a computer readable storage medium. When the program runs, the processes of the method embodiments are performed. The storage medium may be a magnetic disk, an optical disc, a read-only memory (ROM), a random access memory (RAM), or the like.

What is disclosed above is merely examples of embodiments of the present invention, and certainly is not intended to limit the scope of the claims of the present invention. Therefore, equivalent variations made in accordance with the claims of the present invention shall fall within the scope of the present invention.

What is claimed is:

1. A serving base station serving at least one user equipment uses interference coordination with a neighboring-cell base station, comprising:
    a processor; and
    a transceiver coupled with the processor and configured to communicate with the neighboring-cell base station, and the transceiver configured to send, to the user equipment, an interference measurement indication used to control the user equipment to perform interference measurement and to receive downlink interference overload information from the user equipment, wherein the downlink interference overload information is obtained based on a result of the interference measurement by the user equipment, wherein the downlink interference overload information comprises associated subframe information, and the associated subframe information indicates an identifier of an interfered-with subframe of the user equipment, and a downlink interference overload indication list, the downlink interference overload indication list including an identifier of an interfered-with physical resource block in the subframe indicated in the associated subframe information of the user equipment; and
    a non-transitory computer-readable storage medium coupled with the processor and configured to store a program including instructions which, when being executed by the processor, cause the processor to:
    obtain the downlink interference overload information, wherein the downlink interference overload information is used to indicate an interfered-with transmission resource of the user equipment; and
    send the downlink interference overload information to the neighboring-cell base station, so that the neighboring-cell base station performs interference coordination on the transmission resource.

2. The base station according to claim 1, wherein the downlink interference overload indication list comprises an interference degree identifier of each physic al resource block of the user equipment.

3. A method implemented by a serving base station that serves at least one user equipment using interference coordination with a neighboring-cell base station comprising:
    communicating with the neighboring-cell base station by sending to the user equipment an interference measurement indication used to control the user equipment to perform interference measurement and to receive downlink interference overload information from the user equipment, wherein the downlink interference overload information is obtained based on a result of the interference measurement by the user equipment, wherein the downlink interference overload information comprises associated subframe information, and the associated subframe information indicates an identifier of an interfered-with subframe of the user equipment and a downlink interference overload indication list, the downlink interference overload indication list including an identifier of an interfered-with physical resource block in the subframe indicated in the associated subframe information of the user equipment;
    obtaining the downlink interference overload information, wherein the downlink interference overload information is used to indicate an interfered-with transmission resource of the user equipment; and
    sending the downlink interference overload information to the neighboring-cell base station, so that the neighboring-cell base station performs interference coordination on the transmission resource.

4. The method according to claim 3, wherein the downlink interference overload indication list comprises an interference degree identifier of each physical resource block of the user equipment.

5. A non-transitory computer-readable medium having instructions stored therein, which when executed by a processor, cause the processor to a perform a method implemented by a serving base station that serves at least one user equipment using interference coordination with a neighboring-cell base station, the method comprising:
    communicating with the neighboring-cell base station by sending to the user equipment an interference measurement indication used to control the user equipment to perform interference measurement and to receive downlink interference overload information from the user equipment, wherein the downlink interference overload information is obtained based on a result of the interference measurement by the user equipment, wherein the downlink interference overload information comprises associated subframe information, and the associated subframe information indicates an identifier of an interfered-with subframe of the user equipment and a downlink interference overload indication list, the downlink interference overload indication list including an identifier of an interfered-with physical resource block in the subframe indicated in the associated subframe information of the user equipment;
    obtaining the downlink interference overload information, wherein the downlink interference overload information is used to indicate an interfered-with transmission resource of the user equipment; and
    sending the downlink interference overload information to the neighboring-cell base station, so that the neighboring-cell base station performs interference coordination on the transmission resource.

6. The computer-readable medium according to claim 5, wherein the downlink interference overload indication list comprises an interference degree identifier of each physical resource block of the user equipment.

* * * * *